United States Patent Office 2,804,251
Patented Aug. 27, 1957

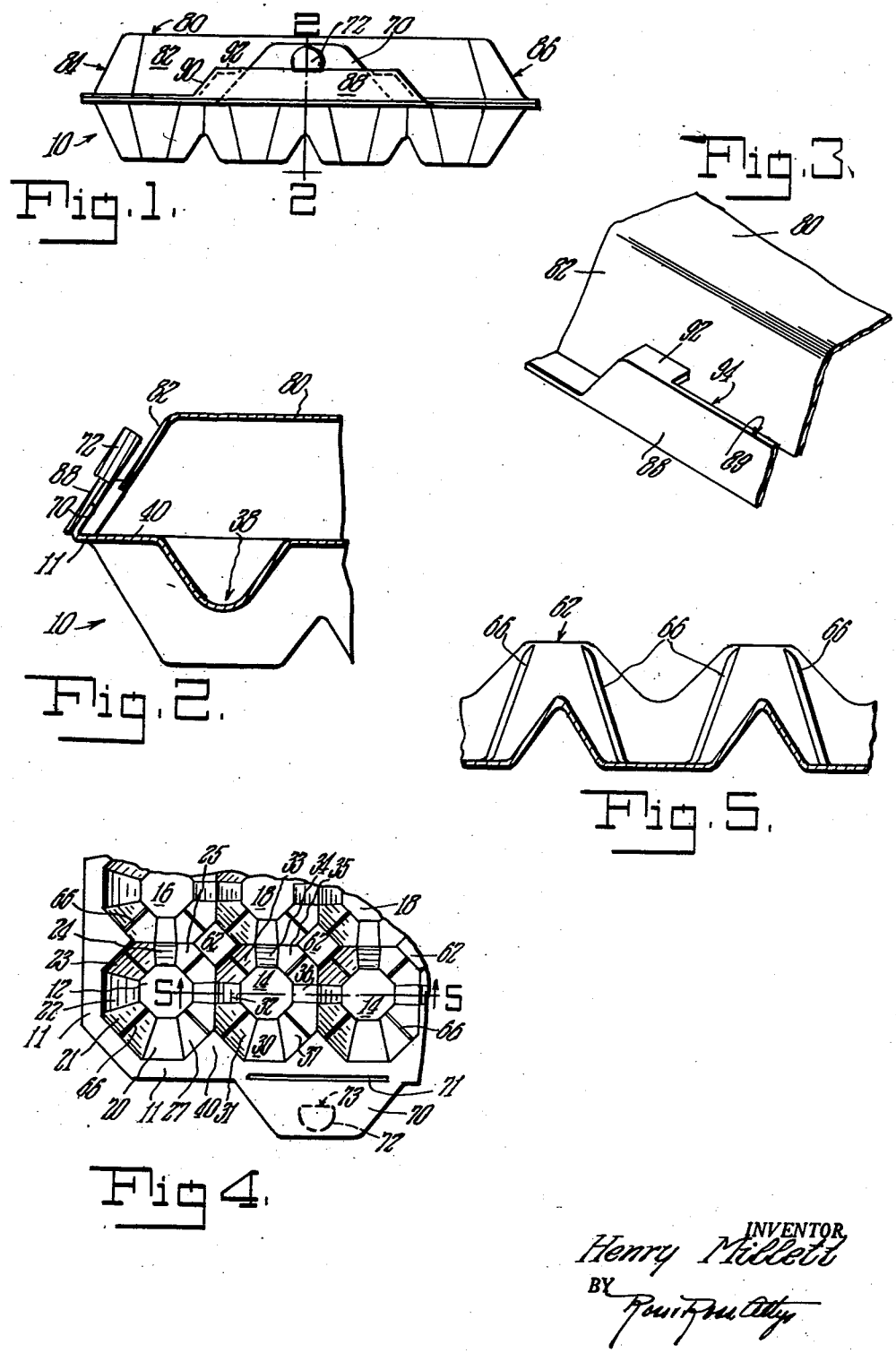

2,804,251

CARTON

Henry Millett, Springfield, Mass., assignor to Atlas Tack Corporation, Fairhaven, Mass., a corporation Application April 26, 1956, Serial No. 580,750

2 Claims. (Cl. 229—2.5)

This invention relates to new and useful improvements in a carrier or container for fragile and breakable articles and is directed more particularly to improved means for providing a simple and effective carrier or container for eggs or like fragile articles.

The invention will be described as particularly relating to a carton adapted to function as a carrier for eggs, although it is not to be considered as necessarily limited to that function, it being equally well adapted to function as a carrier for other frangible articles of similar shapes and dimensions such as light bulbs, radio tubes, and the like.

In the handling of eggs, it has been common practice for the producer to place the eggs in an egg case of considerable size and to ship the eggs in this form to the market where the eggs are then removed from the cases and placed in smaller packages, such as egg cartons capable of handling a dozen eggs. In this form, the eggs are then sold to the ultimate consumer, all as is well known.

These procedures necessitate the handling of the eggs several times so that considerable time is obviously consumed thereby.

Egg cases of the usual types contain, for example, thirty dozen eggs. Each egg must be contained in an individual cell within the case to protect the egg from damage during shipment. Usually egg flats formed of molded pulp or the like are placed between superimposed layers of eggs and fillers which provide individual cells hold these eggs flat in spaced relation. The notorious objection to this arrangement is the resulting spoilage of goods through breakage.

A principal object of this invention is to provide an egg carton of a type capable of holding a dozen eggs, or other convenient number, and to replace the conventional egg cases, flats and fillers previously required as aforesaid.

By means of this invention, breakage of the packed articles during shipment may be prevented, and further by virtue hereof, a more suitable means for dispensing the articles in retail quantities is provided.

Here the eggs are merely placed in the cartons by the producer and a plurality of the cartons may be placed within the egg case.

The cartons of this invention protect the eggs during shipment of the cases and at the same time provide an attractive and practical carton which may be furnished the consumer.

It is another object of the present invention to provide a container for eggs and other fragile and breakable articles, made preferably of moulded pulp material, which is rigid in construction and compact in size and which serves as a protection for the packed articles when the container is subjected to the various shocks and strains incident to shipping and handling.

A feature of the present invention resides in the provision of a carton formed of two connected elements which are arranged to enclose the eggs and to protect the same from damage during handling or shipment, which connected elements may be held in locked engagement as to each other by a unique and novel construction.

One of these elements is tray-like in configuration and functions as a base or receptacle into which the eggs may be inserted.

The other of these elements is likewise tray-like in configuration and functions to enclose the eggs and to form a top closure therefor and to provide an attractive cover which may be printed or stencilled with the name of the producer or other suitable design.

It is another feature hereof to provide a carton which is simple in its construction, economical in its manufacture, and effective for the purpose for which it is designed.

A further feature of the invention lies in the provision of an egg carton having two sections which fold together to contain eggs therebetween and which are provided with a peripheral marginal flange extending about the same.

A still additional object of the invention is to provide a construction for the reception of eggs wherein the eggs are efficiently protected regardless of whether they are large or small, the moulded package providing an enclosure for eggs which offers a yielding but firm protection thereto.

An added feature of the present invention resides in the provision of an egg carton having a series of recesses designed to partially enclose the eggs and in the provision of ribs or other spacing in the walls of these recesses for engaging the eggs at spaced points.

As a result, the eggs are held with the major portions of their respective areas in spaced relation to the walls of the recesses, thus allowing a free circulation of air about the eggs and flexibly supporting the eggs against injury due to shock.

These and other objects and novel features of the invention will be more clearly and fully set forth in the following specification and claims and will become more apparent from a study of the following description in connection with the attached drawings, wherein:

Fig. 1 is a side elevational view of the structure of my invention in the closed or locked position;

Fig. 2 is a sectional view on the line 2—2 of Fig. 1;

Fig. 3 is a partial perspective view of the cover section of the invention showing certain features of construction;

Fig. 4 is a partial top plan view of the cellular bottom section of the invention; and Fig. 5 is an enlarged sectional view on the line 5—5 of Fig. 4.

In the following description and claims, various details will be identified by specific names for convenience. These names however are intended to be as generic in their application as the art will permit.

Referring now to the drawing more in detail, in which similar characters of reference indicate corresponding parts in the several figures and referring more particularly to the preferred form of my invention selected for illustrative purposes, I have illustated a 3 x 4 carton which embodies the principles of the invention and which is capable of being readily molded from a watery slurry of paper pulp fibers.

It will of course be understood that the carton could be of the well known 2 x 6 type or other types with identical results.

While the term egg carton is used in this specification, it will be understood that the carton of the invention is conceived as applicable for use with other more or less frangible articles, all without material alteration in the structural features of the invention.

Accordingly, limitation of this invention should be made only as determined by a proper interpretation of the terms used in the subjoined claims.

The illustrated carton comprises a cellular bottom section and a top or cover section.

One of the requirements of the pulp molding process is that the walls of the article be generally tapered so that same can be withdrawn from the forming die. The tapered walls offer the additional advantage that the articles may be shipped in a nested relation.

Thus, as shown in the drawings, the bottom and cover sections of the present invention are generally rectangular in configuration and have outwardly tapered front and rear and end walls.

The carton bottom section is formed to provide three longitudinal rows of four cells each (or two longitudinal rows of six cells each in the case of a 2 x 6 carton) for accommodating a dozen eggs therein. As aforesaid, cartons of other sizes for accommodating other predetermined quantities of eggs or the like may be employed with similar results within the spirit and scope of this invention.

Each egg receiving cell is generally octagonal in shape and is defined by a bottom and a plurality of upwardly sloping integral wall forming panel members with adjacent panel members merging or connected at their upper ends by web portions which define partitioning formations extending longitudinally and transversely between the cells, in the manner to be hereinafter set forth.

The cellular bottom section best shown in Fig. 4 and generally indicated by the numeral 10 comprises corner cells 12 at the front and rear sides thereof which are disposed in transverse and longitudinal alignment to form corner cells at each corner of each end of the bottom section.

The bottom section also comprises intermediate cells 14 along the front and rear thereof which are disposed in longitudinal alignment to form intermediate cells between the end cells 12.

The bottom section additionally comprises intermediate cells 16 along the opposite ends thereof (in the case of a 3 x 4 carton but not in the case of a 2 x 6 carton) which are disposed in transverse alignment to form intermediate cells between the end cells 12.

Still other intermediate cells 18 are disposed in transverse and longitudinal alignment to form intermediate cells between intermediate cells 14 and 14 and 16 and 16.

The bottom section is symmetrical about transverse and longitudinal center lines and the intermediate cells 14 are identical except for certain adjoining wall structure which will be hereinafter described.

Likewise the intermediate cells 16 at the opposite ends of the bottom section are identical.

The structure of each of the corner cells 12 is also the same, these cells differing from each other only in their positions relative to adjoining cells.

Cells 12 are provided with panel members 20, 21, 22, 23, 24, 25, 26 and 27. Certain thereof extend upwardly to the marginal upper edge 11 of the bottom section 10 and define wall forming portions for the member 10.

Cells 14 are likewise provided with panel members 30, 31, 32, 33, 34, 35, 36 and 37. Certain thereof extend upwardly to the marginal upper edge of the bottom section 10 and define wall forming portions for the member 10.

Cells 16 are likewise provided with similar panel members.

Panels 27 and 31 extend upwardly and are integrally joined at their upper edges with triangular web sections 40 which extend inwardly from the top of the end edge 11 of the section 10 to define the end portion of the longitudinal partition formation.

Panels 26 and 32 of cells 12 and 14 extend upwardly and merge below the plane of the top edge of the section 10 as at 38 in Fig. 2 to define an upstanding ridge-like portion of the longitudinal partition formation which adjoins the end portion thereof.

Panels 25 and 33 of cells 12 and 14 and the adjacent panels and of the adjoining cells extend upwardly and are integrally joined at their upper edges by a rectangular horizontal web portion 62 to define a truncated intermediate partition formation.

A like partition formation is defined by the corresponding adjacent wall panels of each set of four adjoining cells.

These truncated formations 62 combined with the triangle end partition formations 60 and the intermediate ridge-like partition formations provide the longitudinal or medial partition which divides the cells into a plurality of longitudinal rows and define the longitudinal and transverse partitions between adjacent cells.

All adjacent cells are separated by like partitions. Thereby a marginal edge portion 11 is provided around the peripheral edge of the section 10, said portion 11 having a plurality of triangularized web sections 40 spaced therealong, adjacent juxtaposed cells.

All of the cells are provided with bottom members which integrally join the bottom edges of the wall formation panels and which constitute the bottom or supporting face of the lower section.

Ribs 66 are provided in certain of the panel members in each of the cells, these ribs extending inwardly into the cells or pockets.

The ribs extend substantially vertically relative to and centrally of the panels and are integrally molded therewith, as shown.

The ribs form grooves in the truncated cells and engage angularly spaced portions of the eggs to hold the major portion of the area of the egg spaced from the cell or pocket walls to permit a free circulation of air about the eggs.

The ribs are adapted to be depressed in the event that eggs of particularly large size are packaged within the carton. In such instance, upon insertion of the egg into the cell, a slight pressure brought to bear on the egg is reflected outwardly against the ribs at the sides of the eggs causing said ribs to be depressed in a direction away from the egg wherefor the egg of exceptionally large diameter may be properly seated within the cell in the same manner as an egg of normal diameter.

A cover locking panel or hasp like flap member 70 is provided along the top edge of the front wall of the section 10.

The panel 70 is preferably molded substantially in the plane of the top edge of the section and extends for a portion of the length of the section front wall and is adapted to be hinged to an upwardly extending position, as shown in Fig. 2, for employment as will shortly be observed.

The cover section of the carton of the invention is formed by an integrally connected planar top wall 80, front wall 82, similar back wall (not shown), and end walls 84 and 86.

The front, back and end walls extend outwardly and downwardly in angular relation to the top wall and terminate in flanged lower edges.

The back wall is connected by a hinge joint with the upper edge of the rear wall formation of the bottom section 10 in the conventional manner.

The lower edges of the front, back and end walls are formed to correspond and mate with the adjacent walls of the lower section when the cover and lower sections are in the closed position, shown in Fig. 1, all as is well known.

The flap 70 comprises a body portion having a reduced outer free end portion which is substantially wedge shaped, all as shown. Same is molded in outstanding relation but is adapted to be folded upwardly about the meeting edges of the bottom and cover sections when the cover sections is in closed position as will be observed.

If desired, a groove 71 may be provided at the inner edge of the flap 70 to facilitate bending.

A button 72 is provided on the outside of the flap 70 and may be molded out of the stock itself and is designed to function in a manner to be observed.

The front wall 82 of the cover section is provided with an integrally molded locking plate 88 which is spaced outwardly away from the front wall in a generally parallel relationship. Side walls 90 at opposite ends of the plate and a top wall 92 at the top side thereof connect the plate to the front wall and are molded integrally therewith upon the formation of the article.

The top wall 92 is slotted at 94 and provides a means by which the cover and lower sections may be held in interlocking engagement as will now be explained.

When the cover and lower sections are brought into the adjacency assumed in the closed position of Fig. 1, the flap 70 of the lower section may be turned upwardly for insertion through and interlocking engagement with the slot 94 between the locking plate 88 and the front wall 82 of the cover section. The button 72 is so positioned that with the flap 70 inserted in the slot 94 as aforesaid and with the cover and lower sections in the fully closed position, the button 72, having a lowermost flat 73, extends through the slot. The flat 73 substantially abuts the top edge 89 of the plate 88 and the flap is held in juxtaposed relation to the outer side of the front wall 82 and the inner side of the plate 88.

This invention may be embodied in other specific forms without departing from the essential characteristics thereof. The present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What is desired to claim and secure by Letters Patent of the United States is:

1. In a unitary molded packing unit for fragile articles having a receptacle formed with article cells and a cover having upstanding rear and front and side walls with horizontal marginal flanges extending outwardly from said receptacle and cover and with the flanges adjacent the rear walls of the receptacle and cover hinged for swinging of the cover between a closed position on and an open position away from the receptacle, the improvement in means for releasably locking the cover in closed position on the receptacle comprising, an elongated locking plate connected at opposite ends to the front wall of the cover and being spaced outwardly therefrom in substantial parellelism therewith and having an upper free locking edge, the marginal flange of the cover adjacent the front wall thereof being cut away between opposite ends of said locking plate whereby an elongated upwardly extending slot is provided between the front wall and said locking plate open along lower and upper edges of said locking plate, a flap normally coplaner with and hinged to the flange of the receptacle at the front side thereof swingable upwardly, and a button projecting from the outerside of the outermost portion of said flap, said flap being insertable in the lower open side of and through the slot as the cover is swung to closed position and said button being arranged on said flap to extend forwardly over and engage the upper free edge of said locking plate in inserted position of said flap, and said flap being depressible towards the front wall of the cover for removal of said flap and button from the slot in swinging of the cover to open position.

2. The improvement in means for releasably locking cover in closed position on the receptacle as set forth in claim 1 wherein said flap is provided with opposite side edges relatively converging from the flange and wherein a side of said button is provided with a flat complemental with and engages the upper edge of said lock plate.

References Cited in the file of this patent
UNITED STATES PATENTS

| | | |
|---|---|---|
| 1,354,042 | Hunziker | Sept. 28, 1920 |
| 2,044,301 | Hill | June 16, 1936 |
| 2,437,110 | Marler | Mar. 2, 1948 |
| 2,517,465 | Cox | Aug. 1, 1950 |
| 2,587,909 | Sherman | Mar. 4, 1952 |